A. ARNOLD.
Automatic Egg-Steamers.

No. 156,655. Patented Nov. 10, 1874.

Witnesses:
Inventor:

UNITED STATES PATENT OFFICE.

ALFRED ARNOLD, OF TENAFLY, NEW JERSEY.

IMPROVEMENT IN AUTOMATIC EGG-STEAMERS.

Specification forming part of Letters Patent No. 156,655, dated November 10, 1874; application filed August 22, 1874.

*To all whom it may concern:*

Be it known that I, ALFRED ARNOLD, of Tenafly, Bergen county, New Jersey, have invented an Automatic Egg-Steamer or Boiler, of which the following is a specification:

Eggs are seldom cooked to suit the tastes of different persons.

My invention relates to an automatic egg steamer or boiler, wherein, by the use of clock-work, the eggs are cooked automatically, more or less, to suit the taste, without the constant attention of the cook.

Figure 1:
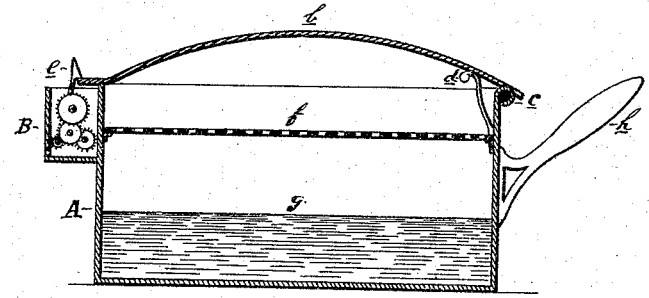

Figure 1 is a vertical section through the center of the utensil.

A is the steamer or boiler. Its cover $b$ is attached to it by a hinge, $c$. $d$ is a spring which opens the cover when the latter is liberated from the catch $e$. $f$ is a perforated diaphragm on which the eggs are placed above the water $g$. $h$ is the handle of the utensil. B contains clock-work which actuates the catch $e$.

The clock-work and its adjustment to actuate $e$ at any desired time being an old device in common use in registering-clocks, alarm-clocks, and other devices, are not shown in detail, and being well known, its detailed description would only add unnecessary prolixity to this specification.

The operation of my invention is as follows: When the water boils, the eggs are placed on the diaphragm. The cover $b$ is shut and held by the catch $e$. The clock-work is adjusted in the ordinary way to any time desired to cook the eggs. At the end of that time it looses the catch $e$. Then the spring $d$ raises the cover $b$, exposing the eggs to the cool air, which condenses the steam and thus stops their cooking.

If desired, an alarm-clock may be employed to notify the cook at the moment of loosing the catch.

Figure 2:

Fig. 2 is a perspective view of another form of my said invention, made of ornamental material and design and provided with a spirit-lamp, to answer the double purpose of cooking utensil and ornamental table-furniture, in which the eggs are both cooked and kept warm on the breakfast-table. In this instance the body of the fowl forms both the cover and the chamber for the clock-work.

If preferred, the clock-work may, by the ordinary skill of the mechanic, be made to remove the flame of the lamp, instead of raising the cover, or may do both.

I claim—

In combination with the clock-work, boiler, and cover, the catch $e$ and spring $d$, substantially as is herein set forth.

ALFRED ARNOLD.

Witnesses:
E. P. BREED,
H. B. STANTON.